United States Patent
Doostnejad et al.

(10) Patent No.: US 9,806,777 B1
(45) Date of Patent: Oct. 31, 2017

(54) COMMUNICATION DEVICE AND A METHOD FOR BEAMFORMING

(71) Applicant: Intel Corporation, Santa Clara, CA (US)

(72) Inventors: Roya Doostnejad, Los Altos, CA (US); Wook Bong Lee, Pleasanton, CA (US); Oner Orhan, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/191,560

(22) Filed: Jun. 24, 2016

(51) Int. Cl.
| | |
|---|---|
| H04L 1/02 | (2006.01) |
| H04B 7/0456 | (2017.01) |
| H04W 16/28 | (2009.01) |
| H04B 7/04 | (2017.01) |

(52) U.S. Cl.
CPC ......... *H04B 7/0456* (2013.01); *H04B 7/0482* (2013.01); *H04W 16/28* (2013.01)

(58) Field of Classification Search
CPC ..... H04L 1/0618; H04L 1/06; H04L 27/2601; H04B 7/0617; H04B 7/0639
USPC ........ 375/267, 260, 347, 349; 370/252, 329; 455/500, 501
See application file for complete search history.

(56) References Cited

U.S. PATENT DOCUMENTS

| | | | |
|---|---|---|---|
| 4,965,605 A | 10/1990 | Chang et al. | |
| 2006/0062320 A1* | 3/2006 | Luz ....................... | H04K 1/006 375/269 |
| 2006/0264184 A1 | 11/2006 | Li et al. | |
| 2010/0117913 A1 | 5/2010 | Jung | |
| 2013/0057432 A1 | 3/2013 | Rajagopal et al. | |
| 2013/0229309 A1 | 9/2013 | Thomas et al. | |
| 2013/0258972 A1 | 10/2013 | Kim et al. | |
| 2014/0050280 A1 | 2/2014 | Stirling-Gallacher et al. | |
| 2014/0198696 A1 | 7/2014 | Li et al. | |
| 2014/0203969 A1 | 7/2014 | Maltsev et al. | |
| 2014/0210666 A1 | 7/2014 | Maltsev et al. | |

(Continued)

FOREIGN PATENT DOCUMENTS

| | | |
|---|---|---|
| CN | 105471484 A | 4/2016 |
| WO | 2004082070 A1 | 9/2004 |

OTHER PUBLICATIONS

K. Sayidmarie et al., "Synthesis of Wide Beam Array Patterns Using Quadratic-Phase Excitations", International Journal of Electromagnetics and Applications, 2013, pp. 127-135, vol. 3(6), ResearchGate.

(Continued)

*Primary Examiner* — Khai Tran
(74) *Attorney, Agent, or Firm* — Viering, Jentschura & Partner mbB

(57) ABSTRACT

A method for a communication device with at least one antenna array composed of a plurality of antenna elements, each of the plurality of antenna elements coupled to a corresponding phase shifter of a plurality of phase shifters. The method includes determining an optimized beam forming weight for each of the plurality of phase shifters by maximizing an array gain of the antenna array for each steering angle of a plurality of pre-defined steering angles to generate a set of optimized beam forming weights for each steering angle; and configuring the plurality of phase shifters with the set of optimized beam forming weights for a selected steering angle to perform beam forming in direction of the selected steering angle.

24 Claims, 5 Drawing Sheets

(56) References Cited

U.S. PATENT DOCUMENTS

| | | | |
|---|---|---|---|
| 2014/0341310 A1* | 11/2014 | Rahman | H04B 7/0408 |
| | | | 375/260 |
| 2015/0288431 A1* | 10/2015 | Sorrells | H04B 1/04 |
| | | | 375/295 |
| 2016/0182138 A1 | 6/2016 | Xi et al. | |
| 2016/0344463 A1* | 11/2016 | Kim | H04B 7/0456 |
| 2017/0163326 A1 | 6/2017 | Kim et al. | |
| 2017/0214443 A1 | 7/2017 | Chen | |

OTHER PUBLICATIONS

Non-final office action based on U.S. Appl. No. 15/183,859 (20 pages) dated on Sep. 5, 2017.
The Extended European Search Report based on Application No. 17170627.8 (9 pages) dated on Aug. 18, 2017.

* cited by examiner

COMMUNICATION DEVICE AND A METHOD FOR BEAMFORMING

TECHNICAL FIELD

Various aspects of this disclosure relate generally to a method and a device for beamforming used in wireless communications.

BACKGROUND

Millimeter wave (mmWave) bands (between 30 GHz and 300 GHz) are an attractive candidate for next-generation cellular systems (5G) due to the vast quantities of spectrum. The main challenge for mmWave is the high path loss resulting from the smaller wavelength. In exploring mmWave, frequencies for wireless communications, indoor and outdoor, a high beamforming gain is required to compensate for the high path loss. Large antenna arrays with phase shifters are used to provide a large antenna gain with a minimum of hardware complexity. An antenna array is a set of individual antennas used for transmitting and/or receiving radio waves, connected together in such a way that their individual currents are in a specified amplitude and phase relationship. Interactions of different phases enhance the signal in one desired direction at the expense of other directions. Thus, an array beam can be produced. The array beam width is inversely proportional to the number of antennas; therefore, a large number of antennas will produce beams with a very narrow half power beam width (HPBW), called pencil beams. Moreover, using low resolution phase shifters may result in significant gaps in spatial resolution, specifically with progressive phase shifting. This is not efficient in many use cases.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
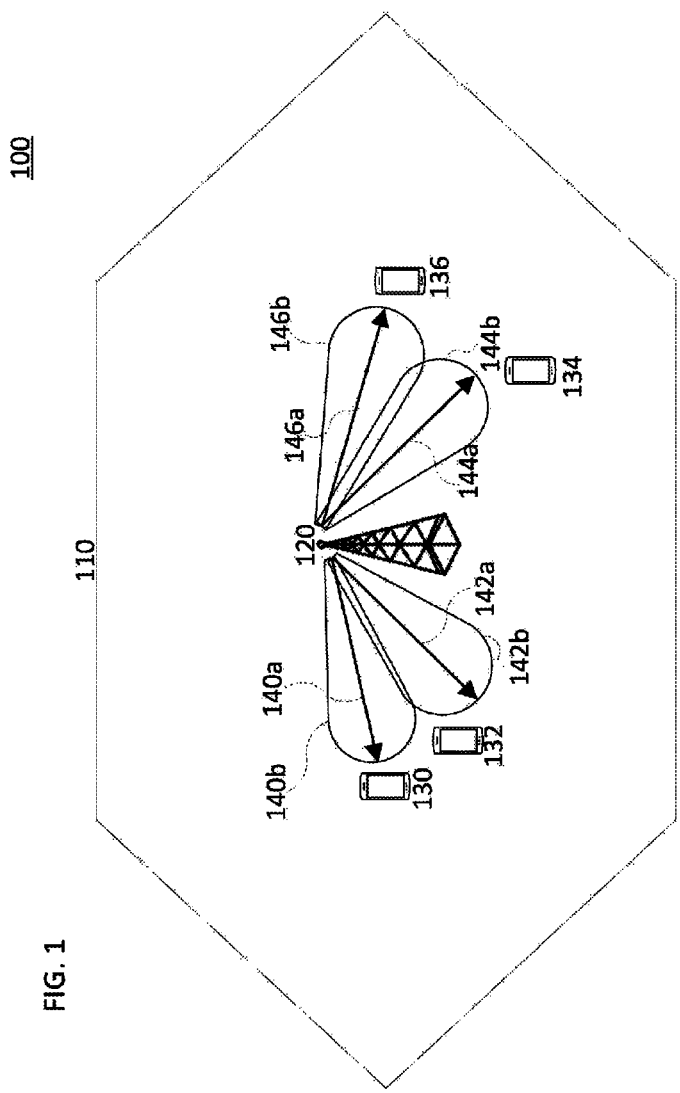
FIG. 1 shows an exemplary communication network in an aspect of this disclosure.

The following details description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

As used herein, a "circuit" may be understood as any kind of a logic implementing entity, which may be special purpose circuitry or a processor executing software stored in a memory, firmware, and any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, e.g., any kind of computer program, for example, a computer program using a virtual machine code, e.g., Java. Any other kind of implementation of the respective functions which will be described in more detail below may also be understood as a "circuit". It may also be understood that any two (or more) of the described circuits may be combined into one circuit.

A "processing circuit" (or equivalently "processing circuitry") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component including one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

As used herein, a "cell", in the context of telecommunications, may be understood as a sector served by a base station. Accordingly, a cell may be a set of geographically co-located antennas that correspond to a particular sector of a base station. A base station may thus serve one or more "cells" (or "sectors"), where each cell is characterized by a distinct communication channel. An "inter-cell handover" may be understood as a handover from a first "cell" to a second "cell", where the first "cell" is different from the second "cell". "Inter-cell handovers" may be characterized as either "inter-base station handovers" or "intra-base station handovers". "Inter-base station handovers" may be understood as a handover from a first "cell" to a second "cell", where the first "cell" is provided at a first base station and the second "cell" is provided at a second, different, base station. "Intra-base station handovers" may be understood as a handover from a first "cell" to a second "cell", where the first "cell" is provided at the same base station as the second "cell". A "serving cell" may be understood as a "cell" that a mobile terminal is currently connected to according to the mobile communications protocols of the associated mobile communications network standard. Furthermore, the term "cell" may be utilized to refer to any of a macrocell, microcell, picocell, or femtocell, etc.

The term "base station", used in reference to an access point of a mobile communications network, may be understood as a macro-base station, micro-base station, Node B, evolved Node B (eNodeB, eNB), Home eNodeB, Remote Radio Head (RRH), or relay point, etc.

It is to be noted the ensuing description discusses utilization of the mobile communications device under 3GPP (Third Generation Partnership Project) specifications, notably Long Term Evolution (LTE), Long Term Evolution-Advanced (LTE-A), and/or 5G. It is understood that such exemplary scenarios are demonstrative in nature, and accordingly may be similarly applied to other mobile communication technologies and standards, such as WLAN wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The examples provided herein are thus understood as being applicable to various other mobile communication technologies, both existing and not yet formulated, e.g. in cases where such mobile communication technologies share similar features as disclosed regarding the following examples.

The term "network" as utilized herein, e.g. in reference to a communication network such as a mobile communication network, is intended to encompass both an access component of a network (e.g. a radio access network (RAN) component) and a core component of a network (e.g. a core network component).

FIG. 1 shows a communication network 100 in an aspect of this disclosure. It is appreciated that communication network 100 is exemplary in nature and thus may be simplified for purposes of this explanation.

Communication network 100 may include at least a base station 120 with a corresponding cover region, or cell, 110. Base station 120 may be an eNB with the capability of hybrid beamforming. Communication network 100 may also contain UEs 130-136. Base station 120 may produce beamforming directions 140a-146a with corresponding beamforming areas 140b-146b, which together, make up a beamforming pattern from the base station.

Beamforming is a technique used in wireless communications for directional signal transmission and/or reception. It combines elements in a phased array in a way to constructively interfere with signals at certain angles while other angles experience destructive interference. In this manner, beamforming may concentrate a signal to a target location, e.g. the UE's location. The improvement compared with omnidirectional reception/transmission is known as the gain (or loss in the case of diminishment). Hybrid beamforming consists of a digital unit with antenna ports processing digital signals and an analog beamforming unit with antenna elements processing analog signals. Each antenna port is connected to a subarray of several antenna elements and receives a digital signal filtered by the analog beamforming.

The desirable beamforming direction may be towards the channel direction, or location, of the UE, so that the received digital signal strength at the antenna port can be maximized. Channel direction information may be provided to the base station.

Communications Network 100 may be configured in accordance with the network architecture of any one of, or any combination of, 5G, LTE (Long Term Evolution), WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc.

Base station 120 may be associated with a radio access section of communication network 100, i.e. the Radio Access Network (RAN) of communication network 100. Base station 120 may thus act as an interface between the RAN of communication network 100 and an underlying core network of communication network 100 and may allow any proximate UEs, such as, for example, UEs 130-136 to exchange data with the core network of communication network 100.

Base station 120 may provide mobile communication coverage to coverage region 110. As shown in FIG. 1, mobile terminals 130-136 may be physically located within coverage region 110 of base station 120. It is appreciated that although coverage region 110 is depicted as having distinct boundaries, it is understood that coverage region 110 may overlap with another coverage region (not pictured), and accordingly there may exist geographical regions served by two or more base stations. As depicted in FIG. 1, mobile terminals 130-136 are physically located within coverage region 110. In this manner, mobile terminals 130-136 may access the RAN of mobile communication network 100 via the base station 120.

Base station 120 may have a plurality of antennas capable of operating in a massive multiple input multiple output (massive MIMO) system. Furthermore, base station 120 may have both digital and analog components in order to employ hybrid beamforming.

Base station 120 may emit hybrid beamforming directions 140a-146a covering areas 140b-146b which collectively form an overall beamforming pattern. Base station 120 initializes a beamforming direction $\theta_n$, e.g. one of 140a-146a, and its corresponding beamforming area on each of its plurality of antenna ports (n=1, 2, ..., N). As shown in FIG. 1, each beamforming area 140b-146b is a main beam (or main lobe). Although not shown in FIG. 1, it is appreciated that each beamforming area 140b-146b may also have sidelobes.

As can be seen from communication network 100, the mobile terminals 130-136 are positioned throughout the coverage region 110 of the base station 120 and thus may be located in various areas of the beamforming pattern produced by the base station 120. For example, mobile terminals 130 and 136 may be positioned substantially in beamforming directions 140a and 146a, respectively, and thus very strong signal gains may be achieved from each of the corresponding antenna ports. Mobile terminal 132 may be positioned in between beamforming directions 140a and 142a, and thus may still report a strong signal gain, albeit not as strong as those exhibited by 130 and 136. In this example, mobile terminal 134 may be located in the weakest area of the beamforming pattern as shown in communication network 100, and thus may report the smallest signal gains. However, the beamforming pattern in this disclosure is designed in a manner in order to maximize coverage and therefore maximize the signal gains in communication network 100. In order to maximize coverage and there maximize the signal gains in communication network 100 it is important to precisely steer the beams towards a mobile device, hence, a narrow spatial resolution of the analog beamforming is required, which will be explained later in detail in the proceeding figures and corresponding explanation.

Figure 2:
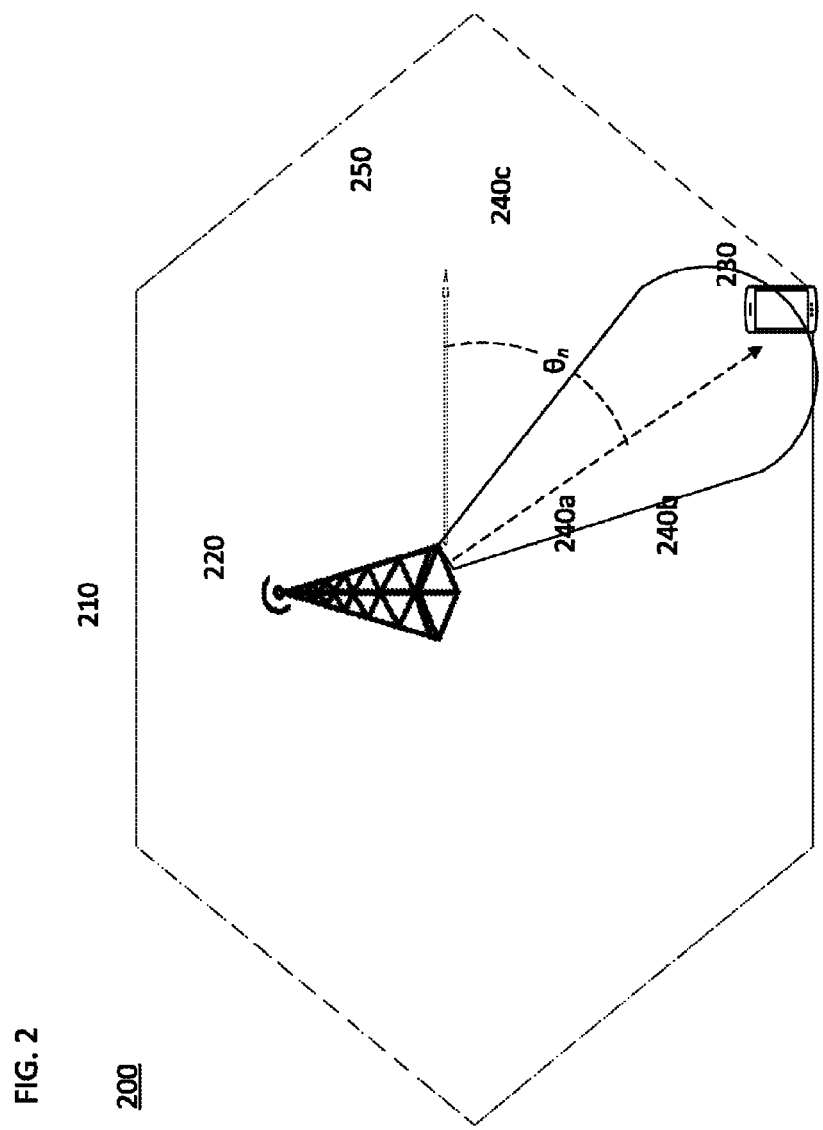
FIG. 2 shows an exemplary communication network scenario in an aspect of this disclosure.

FIG. 2 shows an exemplary communication network scenario 200 in an aspect of this disclosure. In this scenario, a single beamforming direction and its corresponding beamforming area of the overall beamforming pattern will be discussed. It should be appreciated that communication network scenario 200 is exemplary in nature and thus may be simplified for purposes of this explanation.

Base station (e.g. eNB) 220 provides coverage to cell 210 and serves UEs in the coverage area by hybrid beamforming. In the structure of hybrid beamforming, there are N antenna ports (n=1, 2, ..., N) at the base station and each antenna port is connected to a subarray of M antenna elements (m=1, 2, ..., M). Each antenna element has a phase shifter controlled by the analog beamforming weight. In this respect, each antenna port is connected to a phased array of antenna elements in which the relative phases of the respective signals feeding the antenna elements are set in such a way that each antenna port's effective beamforming radiation pattern is reinforced in a desired direction and suppressed in undesired directions.

Broadside 250 is the line from which locations (i.e. angles) in relation to the base station are measured from. Accordingly, the mobile terminal's 230 relative location to the base station 220 is the channel direction information (CDI). The base station 220 may configured to form the beam towards the channel direction information, i.e. towards the channel.

Beamforming in the context of the present disclosure means beam steering towards a direction 240a of base station antenna port n (not pictured) are at angle $\theta_n$ 240c as well as beam shaping, i.e. beam broadening corresponding to beamforming area 240b. It is appreciated that beamforming direction 240a is just one or a plurality of beamforming directions (and beamforming areas, e.g. 240b) which help to form the overall beamforming pattern from base station 220. It is also appreciated that the main beam (or main lobe) of beamforming area 240b is depicted in FIG. 2, but beamforming area 240b may also include sidelobes.

Figure 3:
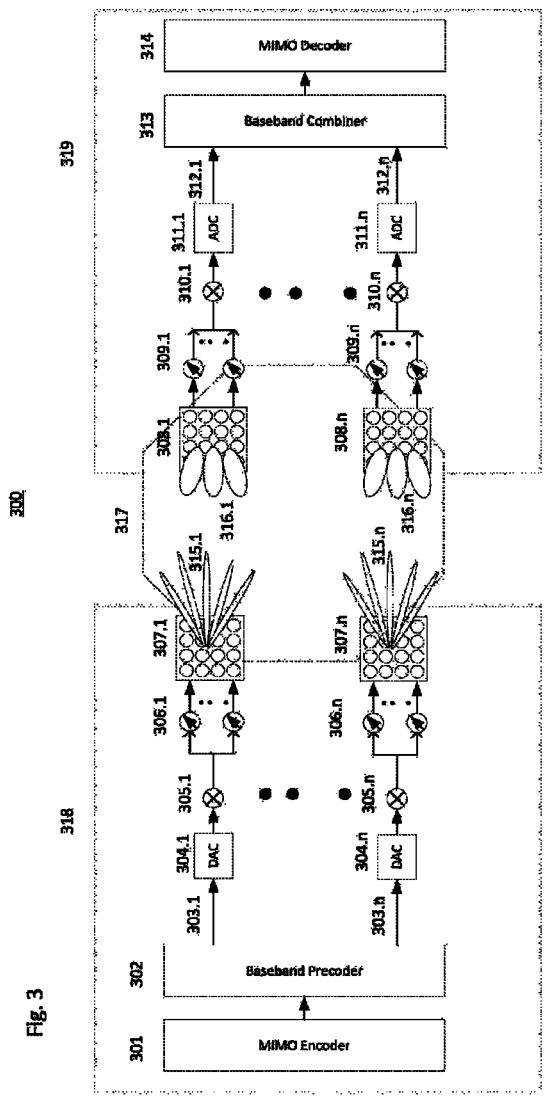
FIG. 3 shows an exemplary system architecture for hybrid beamforming in an aspect of this disclosure.

FIG. 3 shows an exemplary hybrid beamforming system architecture 300, e.g. at a base station, in an aspect of this disclosure. It is appreciated that system architecture 300 is exemplary in nature and may thus be simplified for purposes of this explanation. The hybrid beamforming system architecture 300 includes a transmitter side 318, a radio channel 317 and a receiver side 319.

The digital domain of the transmitter side 318 includes a MIMO encoder 301 and a baseband pre-coder 302 that generates a plurality of digital base-band signals 303.1-303.n, wherein the index following the dot in the reference indicates the antenna port over which the signal is to be transmitted.

Digital-to-analog converters 304.1-304.n convert the digital baseband signals 303.1-303.n to analog baseband signals. The analog domain of the transmitter side 318 includes a plurality of RF-chains.

The first RF-chain includes mixer 305.1, a plurality of phase shifters 306.1 and antenna (sub)-array 307.1 that generates a beam 315.1, wherein the beam 315.1 is shown for a plurality of exemplary beam forming directions.

The n-th RF-chain includes mixer 305.n, a plurality of phase shifters 306.n and antenna (sub)-array 307.n that generates beam 315.n, wherein beam 315.n is shown for a plurality of exemplary beam forming directions.

Regarding the first RF-chain, mixer 305.1 converts the analog baseband signal to an analog radio frequency (RF) signal. Each phase shifter of the plurality of phase shifters 306.1 shifts the phase of the RF signal and feeds the shifted RF signal to its corresponding antenna element of the antenna array 307.1. Depending on the analog beam forming weight, i.e. phase shift, of a phase shifter the beam 315.1 can be steered to a selected beamforming direction. The n-th chain operates in a corresponding way. The phase shifts of the plurality of phase shifters 306.n may differ from the phase shifts of the plurality of phase shifters of any preceding chain, e.g. chain n-1, n-2, up to chain 1, to generate a beam 315.n in a direction that differs from the direction of a beam of any preceding chain, e.g. the direction of beam 315.1

The beams of the first chain to the n-th chain may be steered to compensate the path loss in the mmWave band. When applying MIMO techniques, e.g. spatial multiplexing, each antenna port 1 up to n may be a MIMO port. Antenna array 307.1 may transmit a radio signal over radio channel 317 indicated by the dotted oxagon. The radio signal may be received by each antenna array 308.1-308.$n$ of receiver side 319. Each antenna array of antenna arrays 307.1-307.$n$ may transmit a radio signal. Each antenna array 308.1-308.$n$ of the receiver side 319 may receive a superposition of radio signals transmitted from each of the antenna arrays 307.1-307.$n$ of the transmitter side 318.

The first RF-chain of the receiver side 319 includes antenna array 308.1, a plurality of phase shifters 309.1. Each phase shifter of the plurality of phase shifters is coupled to a corresponding antenna element of antenna array 308.1 and a mixer 310.1. Each phase shifter of the plurality of phase shifters 309.1 shifts the phase of the receive RF-signal of its corresponding antenna element of antenna array 308.1. Mixer 310.1 down-mixes combined shifted RF-signals of each antenna element of antenna array 308.1 to baseband. Analog-to-digital converter 311.1 converts the analog baseband signal to digital domain and feeds it to antenna port 312.1.

The n-th chain of the receiver side 319 includes antenna array 308.$n$, a plurality of phase shifters 309.$n$, wherein each phase shifter of the plurality of phase shifters is coupled to a corresponding antenna element of antenna array 308.$n$ and a mixer 310.$n$. Each phase shifter of the plurality of phase shifters 309.$n$ shifts the phase of the receive RF-signal of its corresponding antenna element of antenna array 308.$n$. Mixer 310.$n$ down-mixes combined shifted RF-signals of each antenna element of antenna array 308.$n$ to baseband. Analog-to-digital converter 311.$n$ converts the analog baseband signal to digital domain and feeds it to antenna port 312.$n$.

Based-band combiner 313 combines the digital baseband signals 312.1 up to 312.$n$ and MIMO decoder performs MIMO decoding on the combined baseband signals.

Figure 4:
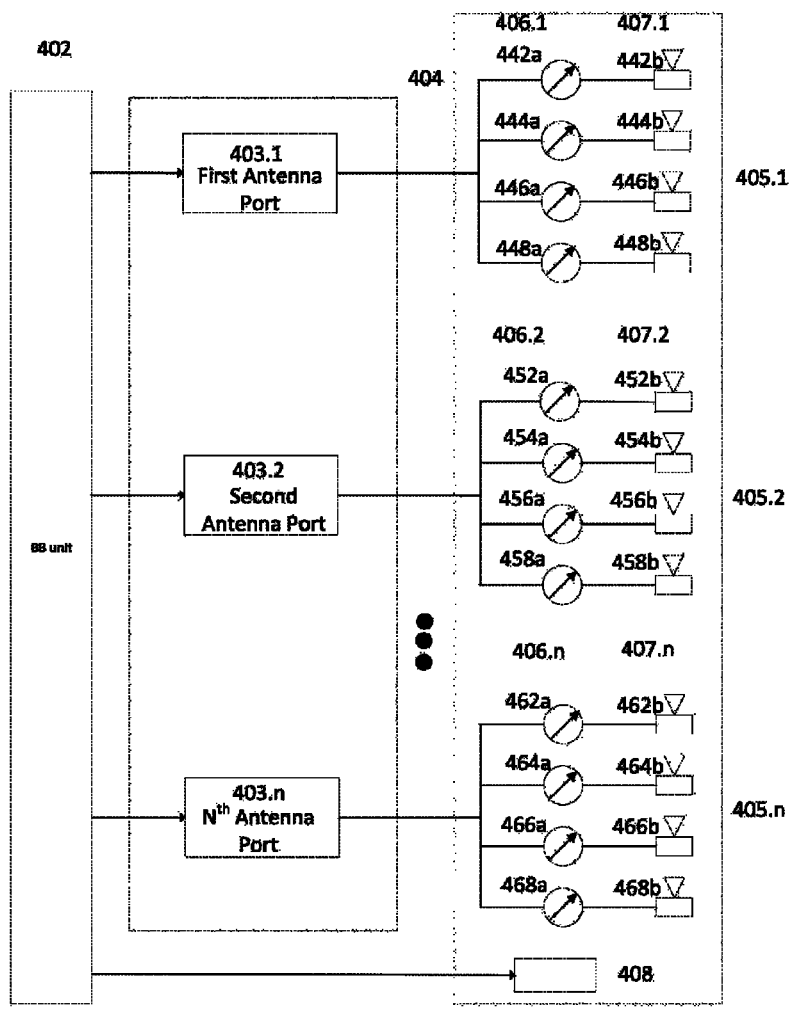
FIG. 4 shows details of the exemplary system architecture as shown in FIG. 3

FIG. 4 shows aspects of the hybrid beamforming system architecture 300 of FIG. 3. Baseband unit 402 is connected to a plurality of antenna ports 403.1-403.$n$ of radio frequency (RF) unit 404. In this example, the first two antenna ports 403.1 and 403.2 and the last (or $N^{th}$) antenna port 403.$n$ are shown. Each antenna port is connected to its corresponding antenna array of the plurality of antenna arrays 405.1-405.$n$ via its corresponding plurality of phase shifters 406.1-406.$n$ that control the phase of the signal of the plurality of antenna elements 407.1-407.$n$, respectively. The antenna arrays 405.1-405.$n$ are included in RF-unit 404. For example, the first antenna port 403.1 is connected to antenna array 405.1 having a plurality of antenna elements 407.1 including a first antenna element 442$b$ through an $M^{th}$ antenna element 448$b$ (as illustrated in FIG. 4, M=4). In system model 400, there are four antenna elements shown for each antenna port, but there may be any number of antenna elements associated with each antenna port. Specifically, the antenna arrays may be two-dimensional. In this example, each antenna array has 2×2 antenna elements.

Each antenna element 442$b$-448$b$ connected to the first antenna port 403.1 has a phase shifter 442$a$-448$a$, respectively, controlled by an analog beamforming weight, i.e. phase shift. Likewise, each antenna element 452$b$-458$b$ of the second antenna array 405.2 connected to second antenna port 403.2 has phase shifters 452$a$-458$a$, respectively. Each antenna element 462$b$-468$b$ of the n-th antenna array 405.$n$ connected to the n-th antenna port 403.$n$ has phase shifters 462$a$-468$a$, respectively.

By applying a phase shift to the signals transmitted by the antenna elements, the direction at which constructive interference may be altered so as to direct the main beam towards any direction. The amplitudes and phases of the signals may be adjusted by applying suitable beamforming weights. Also, for each antenna port/antenna element array system with M antenna elements, the direction of the main beam from each antenna port/antenna element array can be adjusted with up to M−2 sidelobes.

The RF unit 404 may also include a memory 408 in which the analog beam forming weights, i.e. phase shifts, for the plurality of phase shifters 406.1-406.$n$ can be stored. Each phase shifter 442$a$, 444$a$, 446$a$, 448$a$, 452$a$, 454$a$, 456$a$, 458$a$, 462$a$, 464$a$, 466$a$, 468$a$ may be coupled to memory 408 and may thus be configured by its corresponding beam forming weight, i.e. phase shift, stored in memory 408. The baseband module 402 may be configured to write a set of analog beamforming weights for each of the plurality of phase shifters 406.1-406.$n$ to memory 408. Alternatively, the baseband unit 402 may be configured to write a single set of analog beamforming weights including a beamforming weight for each phase shifter 442$a$, 444$a$, 446$a$, 448$a$, 452$a$, 454$a$, 456$a$, 458$a$, 462$a$, 464$a$, 466$a$, 468$a$. The single set of beam forming weights may be allocated to a plurality of code words.

It is appreciated that a base station may include multiple base band units (BBUs) 402 and/or RF units RFUs 404 and may include these components in different configurations, e.g. BBU-RFU integrated components. It is also appreciated that a base station may include other components, e.g., at least one memory component, at least one power component, at least one analog combiner, etc.

A BBU 402 may serve multiple RFUs 404 and may perform the baseband processing of mobile communication signals. BBUs may further provide or receive digital mobile communication signals to or from at least one RRU. The RRUs may be responsible for radio frequency processing of mobile communication signals and may include digital as well as analog circuitry in order to receive and perform initial processing on wireless radio frequency signals. The BBU 402 may exchange digital mobile communication data with one or more RRUs 404 over an optical fiber or similar high-speed connection, such as using a Common Public Radio Interface (CPRI) standard over an optical fiber data link.

It is understood that the components of a base station, such as the BBU 402, RFU 404, and all internal components thereof (e.g. the BBU hardware, RRW hardware, memory components, compression components, etc.) may be structurally implemented as hardware, software executed on hardware or a mixture thereof. BBU 402 and RFU 404 may include one or more digital processing circuits, such as logic circuits, processors, microprocessors, Central Processing Units (CPUs), Graphics Processing Units (GPUs) (including General-Purpose Computing on GPU (GPGPU)), Digital Signal Processors (DSPs), Field Programmable Gate Arrays (FPGAs), integrated circuits, Application Specific Integrated Circuits (ASICs), or any combination thereof. It is understood that a person of skill in the art will appreciate the corresponding structure disclosed herein, be it in explicit reference to a physical structure and/or in the form of mathematical formulas, prose, flow charts, or any other manner providing sufficient structure (such as e.g. regarding an algorithm). The components of base station may be detailed herein substantially in terms of functional operation in recognition that a person of skill in the art may readily appreciate the various possible structural realizations of each component that will provide the desired functionality.

In one aspect of this disclosure each array of the plurality of antenna arrays 405.1-405.$n$ may be a uniform array having uniformly-spaced identical elements of equal size with a linearly progressive phase $\theta_i$ from element to element, wherein i denotes the element index: $\theta_1=0$, $\theta_2=\alpha$, $\theta_3=2\alpha$, ..., $\theta_N=(N-1)\alpha$. $\alpha$ denotes the constant phase difference between adjacent antenna elements. Each phase shifter of the plurality of phase shifters 406.1-406.n may be a digital phase shifter having q-bits of quantization. Thus, the number of steering angles will be limited to $2^q$ in every dimension. This may result in an insufficient spatial resolution independent of the number of elements.

The overall radiation pattern of an antenna array can be described by an array factor. This factor quantifies the effect of combining radiating elements in an array without the element specific radiation pattern taken into account. The overall radiation pattern of an array is determined by this array factor combined with the radiation pattern of the antenna element. The overall radiation pattern results in a certain directivity and thus gain linked through the efficiency with the directivity. Directivity and gain are equal if the efficiency is 100%. Arrays can be designed to radiate in either broadside, i.e. radiation perpendicular to array orientation or end fire, i.e. radiation in the direction as the array orientation.

The array factor depends on the number of elements, the element spacing, amplitude and phase of the applied signal to each element. The number of elements and the element spacing determine the surface area of the overall radiating structure. This surface area is called aperture. A larger aperture results in a higher gain. The aperture efficiency quantifies how efficient the aperture is used. The array directivity increases with the number of elements in use. The presence of side lobes next to a main lobe is typical for arrays.

The gain of a two-dimensional antenna array having M horizontal and N vertical antenna elements for beam steering in direction of azimuth $\theta$ and elevation $\phi$ is given by:

$$\text{Gain}(\theta,\phi) = |\Sigma_{n=1}^{N} \Sigma_{m=1}^{M} e^{j(\theta_{m,n} + k \cdot d \cdot n \cdot \sin\theta \cdot \cos(\phi) + k \cdot d \cdot m \cdot \sin\theta \cdot \sin(\phi))} \cdot A_{m,i}(\theta,\phi)|^2 \quad (1),$$

wherein $A_{m,i}(\theta, \phi)$ is an antenna element pattern, wherein the term in the brackets in front of the antenna element pattern is the array factor, wherein $d=\lambda/2$, $\lambda$ is the wavelength of propagation and wherein $\theta_{m,n}$ is the phase shift of antenna elements m=1 ... M, n=1 ... N.

An aspect of the present disclosure refers to a method for a communication device, e.g. communication device 400 as shown in FIG. 4 with at least one antenna array 405.1 composed of a plurality of antenna elements 407.1. Each of the plurality of antenna elements 442a, 444a, 446a, 448a is coupled to a corresponding phase shifter 442a, 444a, 446a, 448a of a plurality of phase shifters 406.1. The method includes determining an optimized beam forming weight, i.e. phase shift, for each of the plurality of phase shifters by maximizing an array gain of the antenna array for each steering angle of a plurality of pre-defined steering angles to generate a set of optimized beam forming weights for each steering angle. The set of optimized beam forming weights for each steering angle is generally pre-generated offline, e.g. before operating the mobile device. The array gain to be optimized by is given by Eq. 1.

The method further includes configuring the plurality of phase shifters 406.1 with the set of optimized beam forming weights for a selected steering angle to perform beam forming in direction of the selected steering angle of the antenna array coupled to the first antenna port 403.1. The baseband module 402 may configure the plurality of phase shifters by writing a set of optimized to beamforming weights for the plurality of phase shifters 406.1 to memory 408 which is coupled to the plurality of phase shifters 406.1.

The baseband module 402 may provide a set of beam forming weights for each antenna array 405.1-405.n coupled to antenna ports 403.1, 403.2, ..., 403.n to perform beamforming in direction of a selected steering angle for each antenna array 405.1-405.n.

The baseband module 402 may provide a total set of beamforming weights to phase shifters 442a, 444a, 446a, 448a, 452a, 454a, 456a, 458a, 462a, 464a, 466a, 468a to perform beamforming in direction of single steering angle using all antenna arrays.

Each set of optimized beam forming weights may be stored to a codebook, wherein each set of optimized beam forming weights represents a code word of the codebook corresponding to its pre-defined steering angle. Each codeword may be addressable by its corresponding steering angle. The baseband module 402 may command the RF module 404 to perform beamforming in direction of a selected steering angle for a specific antenna array. For this purpose, the baseband module 402 may retrieve a code word corresponding to the selected steering angle for each antenna array from the codebook and write it to memory 408 which is coupled to the plurality of phase shifters 406.1 to 406.n in order to configure the plurality of phase shifters with the retrieved code word for each antenna array. Thus, memory 408 stores a codeword for each antenna array 405.1-405.n.

However, when all antenna arrays shall act as a single large antenna array in order to perform beamforming in direction of a single steering angle, the total set of beamforming weights is represented by a single large code word that is divided into a plurality of code words, each code word representing a corresponding portion of the single large code word which is allocated to each antenna array of antenna arrays 405.1-405.n. Thus, memory 408 stores a plurality of codewords representing a single large codeword that is divided into a plurality of codewords, wherein each of the plurality of codewords configures its corresponding antenna array 405.1-405.n.

For a two-dimensional antenna array having M horizontal and N vertical antenna elements the code word associated with a steering angle in direction of azimuth $\theta$ and elevation $\phi$ may be defined by $e^{j\Theta_{m,n}}$, m=1 ... M, n=1 ... N that optimizes the gain of the antenna array, e.g. as given in Eq. 1.

The phase shifters 442a, 444a, 446a, 448a, 452a, 454a, 456a, 458a, 462a, 464a, 466a, 468a may be digital phase shifters. Thus, the optimized beam forming weights may be quantized. Specifically, an optimized beam forming weight, i.e. optimized phase shift may be quantized as follows $$\theta_i^q = Q(\theta_i), \theta_i^q \varepsilon \left\{ \frac{2\pi}{2^q} \,\middle|\, i=0, \ldots, 2^q - 1 \right\},$$

where $Q(.)$ is a q-bit quantizer. This results in a non-linear pattern for the phase shifters. In contrast to linear progressive phase shifting, the phase difference between adjacent antenna elements may be not constant but differ from antenna element to antenna element. This way, a much narrower spatial resolution, e.g. one degree, can be achieved when compared to linear progressive phase shifting applying the same number of quantization bits, e.g. 3 bits.

Another aspect of the present disclosure relates to a method for beam broadening. Beam broadening, i.e. adjusting the shape of the beam, may use phase-only techniques. The method includes providing a set of optimized phase shifts for the plurality of phase shifters to perform beam forming along a direction of each steering angle of a plurality of pre-defined steering angles and adding an additional phase having a distribution to account for a beam broadening to a set of optimized phase shifts to generate a set of optimized phase shifts for a selected beam broadening and a selected steering angle. The baseband module may configure the plurality of phase shifters with a set of optimized phase shifts corresponding to the selected beam broadening and the selected steering angle to perform beam forming in direction of the selected steering angle with a beam having the selected beam broadening.

The selected beam broaden may include any or a combination of the following: half power beam width, half power beam width in azimuth domain only, half power beam width in elevation domain only, half power beam width in azimuth domain and elevation domain, half power beam width of any side lobe, half power beam width of any side lobe in azimuth domain only, half power beam width of any side lobe in elevation domain only, half power beam width of any side lobe in azimuth domain and elevation domain.

Beam broadening can be applied in both azimuth and vertical domains separately in a two-dimensional antenna array having N antenna elements in horizontal and M antenna elements in vertical dimension as shown FIG. 3.

An additional phase $\phi_{Az}$ accounting for a beam broadening in azimuth dimension may be added to the phase accounting for beam forming in direction of a selected steering angle. The additional phase $\phi_{Az}$ may be given by:

$$\varphi_{Az} = 4\pi c_{Az} \left| \frac{1}{2(N-1)} + \frac{n - \frac{N}{2} - 1}{N-1} \right|^p,$$

wherein n denotes the n-th phase shifter of a row of antenna elements of a two-dimensional antenna array having N antenna elements in horizontal and M antenna elements in vertical dimension, wherein $c_{Az}$ is a design variable which defines a value of the beam broadening in azimuthal dimension and wherein p is a constant which defines side lobes of a beam.

An additional phase $\phi_V$ for a accounting for a beam broadening in vertical dimension which is given by:

$$\varphi_V = 4\pi c_V \left| \frac{1}{2(M-1)} + \frac{m - \frac{M}{2} - 1}{M-1} \right|^p,$$

wherein m denotes the m-th phase shifter of a column of antenna elements of a two-dimensional antenna array having N antenna elements in horizontal and M antenna elements in vertical dimension, wherein $c_V$ is a design variable which defines a value of the beam broadening in vertical dimension and wherein p is a constant which defines side lobes of a beam.

Beam broadening can be applied in azimuth and vertical dimension jointly. A total additional phase $\phi(m, n)$ of an antenna element in a m-th row and a n-th column of the two dimensional antenna array for a beam broadening in azimuthal and vertical dimension may be given by: $\phi(m, n) = \phi_{Az}(n-(m-1), N) + \phi_V(m)$, $m=1, \ldots, M$ $n=1, \ldots, N$.

p may be 2, leading to a quadratic distribution for the additional phase. The design variables $c_{Az}$ and $c_V$ can be determined by simulation in order to achieve a desired beam broadening.

The phase shifters 442a, 444a, 446a, 448a, 452a, 454a, 456a, 458a, 462a, 464a, 466a, 468a may be digital phase shifters. Thus, the optimized phase shifts may be quantized after adding the additional phase accounting for the beam broadening. An optimized beam forming weight, i.e. optimized phase shift, may be quantized as follows $$\theta_i^q = Q(\theta_i), \theta_i^q \varepsilon \left\{ \frac{2\pi}{2^q} \middle| i = 0, \ldots, 2^q - 1 \right\},$$

where $Q(.)$ is a q-bit quantizer.

Beam broadening may be performed online, i.e. the additional phase shift may be added to a pre-computed phase shift accounting for beam steering along a pre-defined direction. Alternatively, the total phase shift accounting for beam forming in a pre-defined direction as well as a pre-defined beam broadening may be pre-computed offline.

Each set of optimized beam forming weights accounting for a beam forming in a pre-defined direction as well as a pre-defined beam broadening may be stored to a codebook. Each set of optimized beam forming weights represents a code word of the codebook corresponding to its pre-defined steering angle and its pre-defined beam broadening. Each code word may be addressable by its corresponding steering angle and its corresponding beam broadening. The baseband module 402 may command the RF module 404 to perform beamforming in direction of a selected steering angle and for a selected beam broadening for a specific antenna array. For this purpose, the baseband module 402 may retrieve a code word for each antenna array 405.1 to 405.n corresponding to the selected steering angle and selected beam broadening from the codebook and write it to memory 408 coupled to the plurality of phase shifters 406.1 to 406.n in order to configure phase shifters 442a, 444a, 446a, 448a, 452a, 454a, 456a, 458a, 462a, 464a, 466a, 468a with the retrieved code word for each antenna array, respectively.

The codebook may also be addressable by design variables $c_{Az}$ and $c_V$ and constant p to retrieve a code word for a selected beam broadening. The selected beam broadening may be a half power band width defined for azimuth domain and vertical domain. By applying this phase-only technique the half power band width can be maintained over the full range of angles from broadside to end-fire. Specifically, there is no loss in gain for end-fire angles.

For the codebook a plurality of use cases may be defined, e.g. single user or multiuser employing a different number of RF chains and a different number of elements. For example, only antenna ports 403.1 and 403.2 and thus antenna arrays 405.1 and 405.2 may be employed, wherein antenna array 405.1 forms a first beam having a first direction and first beam broadening and antenna array 405.2 forms a second beam having a section direction and a second beam broadening. Alternatively, all antenna ports 403.1-403.n may be employed, wherein each of the antenna arrays 405.1-405.n forms a different beam. Any number of antenna ports and thus antenna arrays may be employed.

Moreover, antenna arrays may be combined to form a single beam in a selected direction and having a selected beam broadening. For example, antenna arrays 405.1 and 405.2 may be combined. The phase shifts for phase shifters 442a, 444a, 446a, 448a, 452a, 454a, 456a, 458a are then optimized jointly to form the beam. The first code word includes phase shifts for phase shifters 442a, 444a, 446a, 448a and the second code word includes phase shifts for phase shifters 452a, 454a, 456a, 458a. This use case is then be defined by the combination of the first codeword and the second codeword. For another example, all antenna arrays 405.1-405.$n$ may be combined to form a single beam in a selected direction and having a selected beam broadening. This use case is then defined by the combination of code words for each of the plurality of phase shifters 406.1-406.$n$.

A sectorization use case may be defined for the codebook. Each of the plurality of antenna arrays 405.1-405.$n$ may be associated with a corresponding sector of a plurality of sectors. Each code word corresponding to a steering angle of the plurality of pre-defined steering angles word may include two layers, a first layer corresponding to a first beam broadening and a second layer corresponding to a second beam broadening. Baseband unit 402 retrieves a code word for each of the plurality of sectors corresponding to a selected. Base band unit 402 configures the plurality of phase shifters 406.1-406.$n$ of each antenna array of the plurality of antenna arrays 405.1-405.$n$, respectively, that is associated with a corresponding sector of the plurality of sectors.

The code book may be designed as a multi-layer code book to implement sectorization with variable beam width using a variable beam broadening and employing all antenna elements. This may provide an implementation solution for a two-tier codebook: tier-1 covers wider beams, tier-2 covers narrower beams: Associated to every code word in tier-1, there is a set of code words in tier-2. For example, if tier-1 codebook generates beams with HPBW=15 degree, then the code word to generate steering beam will be designed to 30 degree on azimuth. Associated to this code word there is a set of code words in tier-2, e.g. tier-2 refers to HPBW=3 degree, which includes beams steering to: 15, 18, 21, 24, 27, 30. In this example, associated to one code word in the tier-1 Codebook, there are 6 code words in the tier-2 codebook.

A use case may include beam tracking or initial cell acquisition or initial user acquisition. A narrower beam may used for beam tracking. A wider beam may be required for initial user acquisition or initial cell acquisition. The proposed beam broadening can be used to adapt the half power beam width based on the use case. Hence, at least some of the code words of the codebook may be associated with a specific use case.

Beam broadening as described above may be applied to generate a pseudo-omni radiation pattern. In mm-Wave communications, for initial user or cell acquisition, an omni antenna may be used in either a transmitter or a receiver at either a base station or a mobile terminal. This, however, limits the link budget for the acquisition procedure because only a single element is used in one end. In an aspect of the disclosure, all antenna elements may be employed and a large beam broadening may be applied to generate a pseudo-omni pattern. This can be used for both transmitter and receiver and significantly increase the link budget compared to a omni transmit/receive. The array gain is reduced because of the broadening but since all antenna elements are used to transmit/receive power, the total transmit/receive power is increased.

A pseudo-omni radiation pattern may be defined by a combination of design variable c constant p and for all of the plurality antenna arrays. The beam forming weights, i.e. phase shifts, may be optimized jointly to generate the pseudo-omni beamforming pattern to yield a total set of beam forming weights. Beam broadening is applied. All antenna arrays 405.1-405.$n$ act as a single large antenna array in order to generate the pseudo-omni beamforming pattern. The total set of beamforming weights may be represented by a single large code word that is divided into a plurality of code words, each code word representing a corresponding portion of the single large code word which is allocated to each antenna array of antenna arrays 405.1-405.$n$. Thus, memory 408 stores a plurality of codewords representing the single large codeword that is divided into a plurality of codewords, wherein each of the plurality of codewords configures its corresponding antenna array 405.1-405.$n$.

The baseband module 402 may command the RF module 404 to perform beamforming to generate the pseudo-omni radiation pattern. For this purpose, the baseband module 402 may retrieve a single large code word from the codebook and write it to memory 408 which is coupled to the plurality of phase shifters 406.1 to 406.$n$. The single large code word is composed of a plurality of code words, wherein each code word configures a plurality of phase shifters 406.1 to 406.$n$ of antenna arrays 405.1-405.$n$, respectively. Thus, memory 408 stores a code word for each antenna array 405.1-405.$n$.

Now referring back to FIG. 3, each of the antenna ports 303.1-303.$n$ (in FIG. 4. 403.1-403.$n$) may be employed as multiple input multiple output (MIMO) port for applying MIMO techniques. MIMO encoder 301 generates a data stream for each of the MIMO ports 303.1-303.$n$.

Analogue beam forming may be applied by configuring the plurality of phase shifters 306.1-306.$n$ of each antenna array in use to compensate for a path loss at millimeter wave bands. The baseband precoder 302 may additionally be employed to apply digital beamforming to perform MIMO techniques on each of the data streams.

Figure 5:
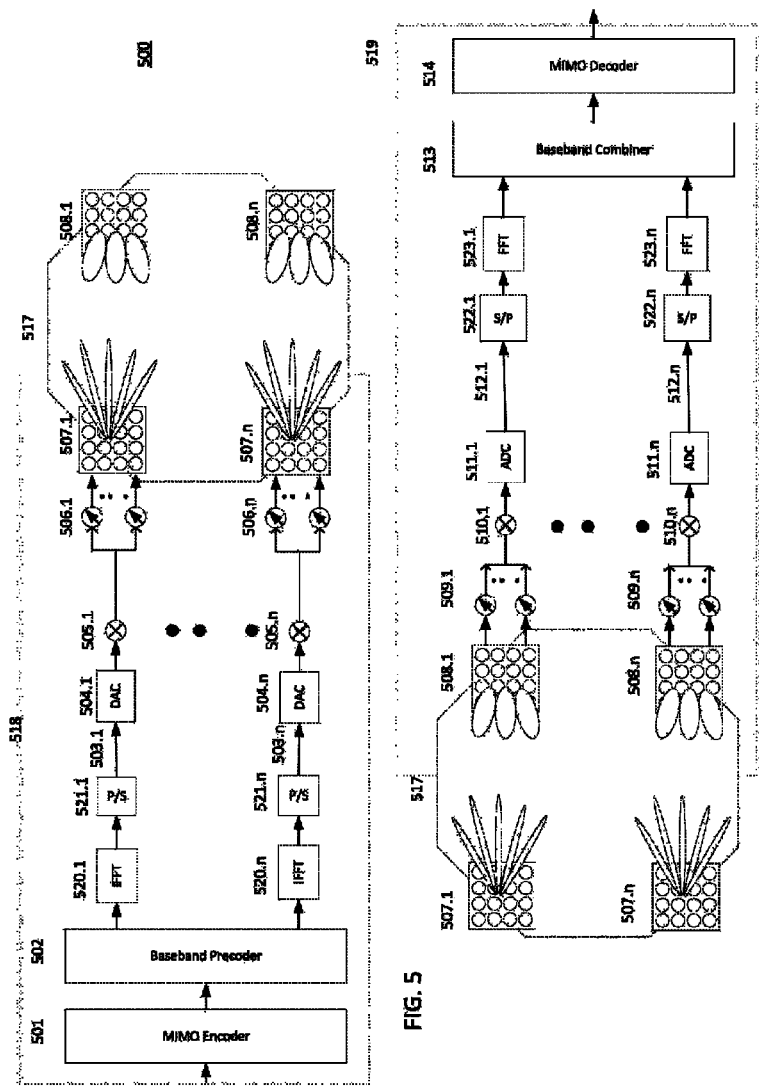
FIG. 5 shows an exemplary system architecture for hybrid beamforming and MIMO OFDM in an aspect of this disclosure.

FIG. 5 shows a system model 500 in an aspect of this disclosure that is related to MIMO orthogonal frequency division multiplexing (OFDM). It is appreciated that system model 500 is exemplary in nature and thus may be simplified for purposes of this explanation. The hybrid beamforming system model 500 includes a transmitter side 518, a radio channel 517 and a receiver side 519.

The digital domain of the transmitter side 518 includes a MIMO encoder 501, a baseband pre-coder 502 that generate a plurality of digital bit streams. Each of the IFFT units 520.1-520.$n$ modulates subcarriers of a corresponding OFDM symbol by loading bits of a respective bit stream onto the subcarriers. Parallel-to-serial converters 521.1-521.$n$ convert the parallel output of the IFFT units 520.1-520.$n$ to serial time domain OFDM symbols, respectively. Digital-to-analog converters 504.1 up to 504.$n$ convert the digital baseband signals 503.1-503.$n$ to an analog baseband signal. The analog domain of the transmitter side 518 includes a plurality of RF-chains.

The first RF-chain includes mixer 505.1, a plurality of phase shifters 506.1 and antenna (sub)-array 507.1 that generates a beam 515.1, wherein the beam 515.1 is shown for a plurality of exemplary beam forming directions.

The n-th RF-chain includes mixer 505.$n$, a plurality of phase shifters 506.$n$ and antenna (sub)-array 507.$n$ that generates beam 515.$n$, wherein beam 515.$n$ is shown for a plurality of exemplary beam forming directions.

Regarding the first RF-chain, mixer 505.1 converts the analog baseband signal to an analog radio frequency (RF) signal. Each phase shifter of the plurality of phase shifters 506.1 shifts the phase of the RF signal and feeds the shifted RF signal to its corresponding antenna element of the antenna array. Depending on the analog beam forming weight, i.e. phase shift, of a phase shifter, the beam 515.1 can be steered to a selected beamforming direction. The n-th chain operates in a corresponding way. The phase shifts of the plurality of phase shifters 506.$n$ may differ from the phase shifts of the plurality of phase shifters of any preceding chain, e.g. chain n-1, n-2, up to chain 1, to generate a beam 515.n in a direction that differs from the direction of a beam of any preceding chain, e.g. the direction of beam 515.1

The beams of the first chain to the n-th chain may be steered to compensate the path loss in the mm-Wave band. When applying MIMO techniques, e.g. spatial multiplexing, each antenna port 1 up to n may be a MIMO port. Antenna array 507.1 may transmit a radio signal over radio channel 517 indicated by the dotted oxagon. The radio signal may be received by each antenna array 508.1 up to 508.n of receiver side 519. Each antenna array of antenna arrays 507.1 up to 507.n may transmit a radio signal. Each antenna array 508.1 up to 508.n of the receiver side 518 may receive a superposition of radio signals transmitted from each of the antenna arrays 507.1 up to 507.n of the transmitter side 519.

The first RF-chain of the receiver side 519 includes antenna array 508.1, a plurality of phase shifters 509.1. Each phase shifter of the plurality of phase shifters is coupled to a corresponding antenna element of antenna array 508.1 and a mixer 510.1. Each phase shifter of the plurality of phase shifters 509.1 shifts the phase of the receive RF-signal of its corresponding antenna element of antenna array 508.1. Mixer 510.1 down-mixes combined shifted RF-signals of each antenna element of antenna array 508.1 to baseband. Analog-to-digital converter 511.1 converts the analog baseband signal to digital domain and feeds it to antenna port 512.1. Serial to parallel converter 522.1 converts the serial digital base band signal to parallel. FFT unit 523.1 demodulates the parallel digital base band signal and produces a plurality of parallel symbol streams in frequency domain.

The n-th chain of the receiver side 519 includes antenna array 508.n, a plurality of phase shifters 509.n. Each phase shifter of the plurality of phase shifters is coupled to a corresponding antenna element of antenna array 508.n and a mixer 510.n. Each phase shifter of the plurality of phase shifters 509.n shifts the phase of the receive RF-signal of its corresponding antenna element of antenna array 508.n. Mixer 510.n down-mixes combined shifted RF-signals of each antenna element of antenna array 508.n to baseband. Analog-to-digital converter 511.n converts the analog baseband signal to digital domain and feeds it to antenna port 512.n.

Based-band combiner 513 combines the parallel symbol streams in frequency domain generated by each of the FFT units 523.1-523.n. MIMO decoder performs MIMO decoding on combined symbol streams. MIMO decoding may include inverting the channel matrix of each subcarrier.

Any principles with regards to beam forming and beam broadening as described in connection with FIG. 4 may also be applied to the MIMO-OFDM architecture as shown in FIG. 5

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims, and all changes within the meaning and range of equivalency of the claims are therefore intended to be embraced.

Example 1 includes a method for beamforming used in a communication device having one or more antenna arrays configured to have a plurality of antenna elements, each of the plurality of antenna elements coupled to a corresponding phase shifter of a plurality of phase shifters, the method comprising: setting a plurality of pre-defined steering angles; determining an optimized beam forming weight for each of the plurality of phase shifters by maximizing an array gain of the one or more antenna arrays for each steering angle of the plurality of pre-defined steering angles; generating a set of optimized beam forming weights for each steering angle based on the optimized beam forming weight for each of the plurality of phase shifters; and configuring the plurality of phase shifters with the set of optimized beam forming weights for a selected steering angle to perform beam forming in a direction of the selected steering angle.

Example 2 includes the method according to example 1 further comprising: storing each set of optimized beam forming weights to a codebook, wherein each set of optimized beam forming weights represents a code word of the codebook corresponding to its pre-defined steering angle and wherein each code word is addressable by its corresponding pre-defined steering angle; and retrieving a code word corresponding to a selected steering angle from the codebook; and configuring the plurality of phase shifters with the retrieved code word to perform beam forming in direction of the selected steering angle.

Example 3 includes the method according to any of examples 1 to 2, wherein each of the plurality of phase shifters is a digital phase shifter, the method further comprising: quantizing each beam forming weight of each set of optimized beam forming weights to generate a set of quantized optimized beam forming weights for each of the plurality of pre-defined steering angles; and configuring the plurality of phase shifters with the set of quantized optimized beam forming weights corresponding to a selected steering angle to perform beam forming in direction of the selected steering angle.

Example 4 includes the method according to any of examples 1 to 3, wherein an optimized beam forming weight represents a phase shift $\theta$.

Example 5 includes the method according to example 4, wherein quantizing each beam forming weight comprises quantizing each phase shift $\theta$ using a q-bit quantizer having quantization intervals of the same size, each quantization interval representing a portion of a unit circle.as follows:

$$\theta_i^q = Q(\theta_i), \theta_i^q \varepsilon \left\{ \frac{2\pi}{2^q} \,\middle|\, i = 0, \ldots, 2^q - 1 \right\},$$

where Q(.) is a q-bit quantizer.

Example 6 includes the method according to example 4 or 5, the method further comprising: adding an additional phase having a distribution to account for a beam broadening to each set of optimized beam forming weights to generate a set of optimized beam forming weights for each of a plurality of pre-defined beam broadening and pre-defined steering angle; and configuring the plurality of phase shifters with the set of optimized beam forming weights for a selected beam broadening and a selected steering angle to perform beam steering in direction of the selected steering angle with a beam having the selected beam broadening.

Example 7 includes the method according to example 6, wherein each of the plurality of phase shifters is a digital phase shifter, the method further comprising: quantizing each beam forming weight after adding an additional phase having a distribution to account for a beam broadening to generate a set of quantized beam forming weights for each of a plurality of pre-defined beam broadening and pre-defined steering angle; and configuring the plurality of phase shifters with the set of quantized optimized beam forming weights for a selected beam broadening and a selected steering angle to perform beam steering in direction of the selected steering angle with a beam having the selected beam broadening.

Example 8 includes the method according to example 6 or 7, wherein the selected beam broadening comprises any or a combination of the following:
half power beam width, half power beam width in azimuth domain only, half power beam width in elevation domain only, half power beam width in azimuth domain and elevation domain, half power beam width of any side lobe, half power beam width of a side lobe in azimuth domain only, half power beam width of a side lobe in elevation domain only, half power beam width of a side lobe in azimuth domain and elevation domain.

Example 9 includes the method according to any of examples 6 to 8, wherein the distribution of the additional phase comprises a distribution for an additional phase $\varphi_{Az}$ accounting for a beam broadening in azimuthal dimension which is given by:

$$\varphi_{Az} = 4\pi c_{Az} \left| \frac{1}{2(N-1)} + \frac{n - \frac{N}{2} - 1}{N - 1} \right|^p,$$

wherein n denotes the n-th phase shifter of a row of antenna elements of a two-dimensional antenna array having N antenna elements in horizontal and M antenna elements in vertical dimension, wherein $c_{Az}$ is a design variable which defines a value of the beam broadening in azimuthal dimension and wherein p is a constant which defines side lobes of a beam.

Example 10 includes the method according to any of examples 6 to 9, wherein the distribution of the additional phase comprises a distribution of an additional phase $\varphi_V$ accounting for the beam broadening in vertical dimension which is given by:

$$\varphi_V = 4\pi c_V \left| \frac{1}{2(M-1)} + \frac{m - \frac{M}{2} - 1}{M - 1} \right|^p,$$

wherein m denotes the m-th phase shifter of a column of antenna elements of a two-dimensional antenna array having N antenna elements in horizontal and M antenna elements in vertical dimension, wherein $c_V$ is a design variable which defines a value of the beam broadening in vertical dimension and wherein p is a constant which defines side lobes of a beam.

Example 11 includes the method according to any of examples 9 or 10, wherein a total additional phase $\varphi(m, n)$ of an antenna element in a m-th row and a n-th column of the two dimensional antenna array is given by $$\varphi(m,n) = \varphi_{Az}(n-(m-1),N) + \varphi_V(m), m=1, \ldots, M \; n=1, \ldots, N.$$

Example 12 includes the method according to any of examples 6 to 11, the method comprising:
storing each set of optimized beam forming weights to a codebook, wherein each set of optimized beam forming weights represents a code word of the codebook corresponding to its pre-defined steering angle and its pre-defined beam broadening and wherein each code word is addressable by its corresponding pre-defined steering angle and pre-defined beam broadening; and
retrieving a code word corresponding to a selected steering angle and a selected beam broadening from the codebook; and
configuring the plurality of phase shifters with the retrieved code word to perform beam forming in direction of the selected steering angle with a beam having the selected beam broadening.

Example 13 includes the method according to example 12, wherein the selected beam broadening comprises any or a combination of the following: half power beam width, half power beam width in azimuth domain only, half power beam width in elevation domain only, half power beam width in azimuth domain and elevation domain, half power beam width of any side lobe, half power beam width of any side lobe in azimuth domain only, half power beam width of any side lobe in elevation domain only, half power beam width of any side lobe in azimuth domain and elevation domain.

Example 14 includes the method according to example 12 or 13, wherein the codebook is addressable by design variable c which defines a value of a beam broadening and by constant p which defines side lobes of a beam.

Example 15 includes the method according to example 14, wherein storing each set of optimized beam forming weights to a codebook comprises: defining a use case by a combination of design variable c and constant p; and wherein retrieving a code word corresponding to a selected steering angle and a selected beam broadening from the codebook comprises: retrieving a code word corresponding to a selected steering angle and selected use case from the code word to perform beam forming for the selected use case in direction of the selected steering angle.

Example 16 includes the method according to example 15, wherein the use case comprises beam tracking, initial cell acquisition or initial user acquisition.

Example 17 includes the method according to example 16, wherein beam tracking comprises a narrower beam compared to initial cell acquisition or initial user acquisition.

Example 18 includes the method according to any of examples 6 to 17, wherein the selected beam broadening comprises a selected half power beam width maintained over a full range from broadside to end-fire.

Example 19 includes the method according to any of examples 1 to 17, wherein the communication device includes a plurality of antenna arrays, the method further comprising:
for each of the plurality of antenna arrays in use:
configuring the plurality of phase shifters of each of the plurality of antenna arrays in use with the set of optimized beam forming weights for a selected beam broadening and a selected steering angle to perform beam forming in direction of the selected steering angle with a beam having the selected beam broadening.

Example 20 includes the method according to example 19 further comprising:
for each of the plurality of antenna arrays:
storing each set of optimized beam forming weights to a codebook, wherein each set of optimized beam forming weights represents a code word of the codebook corresponding to its pre-defined steering angle and its pre-defined beam broadening and wherein each code word is addressable by its corresponding pre-defined steering angle and its beam broadening; and for each of the plurality of antenna arrays:
retrieving a code word corresponding to a selected steering angle from the codebook; and configuring the plurality of phase shifters with the retrieved code word to perform beam forming for a combination of a number of antenna arrays in use in direction of the selected steering angle.

Example 21 includes the method according to example 20 further comprising:
defining a sectorization use case, wherein each of the plurality of antenna arrays is associated with a corresponding sector of a plurality of sectors and wherein each code word corresponding to a steering angle of the plurality of pre-defined steering angles word comprises two layers, a first layer corresponding to a first beam broadening and a second layer corresponding to a second beam broadening; and
for each of the plurality of sectors:
retrieving a code word corresponding to a selected steering angle and layer; and
configuring the plurality of phase shifters of the antenna array of the plurality of antenna arrays that is associated with a corresponding sector of the plurality of sectors.

Example 22 includes the method according to example 19, the method further comprising:
for each of the plurality of antenna arrays:
defining a pseudo-omni radiation pattern by a combination of design variable c constant p and steering angle chosen to generate a pseudo-omni radiation pattern; and wherein
retrieving a code word corresponding to a selected steering angle and a selected beam broadening from the codebook comprises:
retrieving a code word corresponding to the selected pseudo-omni ration pattern to perform beamforming for the pseudo-omni radiation pattern; and
configuring the plurality of phase shifters of each respective antenna array with the retrieved code word to generate the pseudo-omni radiation pattern.

Example 23 includes the method according to any of examples 18 to 22, wherein determining an optimized beam forming weight for each of the plurality of phase shifters comprises:
determining an optimized beam forming weight for each of the plurality of phase shifters of each of a plurality of antenna arrays in use by maximizing a total array gain of a combination of the plurality of antenna arrays in use for each steering angle of a plurality of pre-defined steering angles to generate a set of optimized beam forming weights for each steering angle; and
configuring the plurality of phase shifters of the plurality of antenna arrays in use with the set of optimized beam forming weights for a selected steering angle to perform beam forming in direction of the selected steering angle.

Example 24 includes the method according to example 22, the method further comprising storing each set of optimized beam forming weights to a codebook, wherein each set of optimized beam forming weights represents a code word of the codebook corresponding to its pre-defined steering angle and its number of antenna arrays in use and wherein each code word is addressable by its corresponding pre-defined steering angle and its number of antenna arrays in use; and
retrieving a code word corresponding to a selected steering angle from the codebook; and configuring the plurality of phase shifters with the retrieved code word to perform beam forming for a combination of a number of antenna arrays in use in direction of the selected steering angle.

Example 25 includes the method according to example 23, the method further comprising:
for a combination of a plurality of antenna arrays in use:
defining a pseudo-omni radiation pattern use case by a combination of design variable c constant p and steering angle chosen to generate a pseudo-omni radiation pattern; and wherein
retrieving a code word corresponding to a selected steering angle and a selected beam broadening from the codebook comprises:
retrieving a code word corresponding to the selected pseudo-omni ration pattern use case to perform beamforming for the pseudo-omni radiation pattern use case; and
configuring the plurality of phase shifters of each respective antenna array of the plurality of antenna arrays in use with the retrieved code word to generate a pseudo-omni radiation pattern.

Example 26 includes the method according to any of examples 18 to 24, wherein each of the plurality of antenna arrays is coupled to a radio frequency (RF) chain, the method further comprising: using each RF chain as a multiple input multiple output (MIMO) port for applying MIMO techniques.

Example 27 includes the method according to any of examples 18 to 25, the method further comprising:
applying analogue beam steering by configuring the plurality of phase shifters of each antenna array in use to compensate for a path loss at millimeter wave bands; and
applying digital beamforming to perform MIMO techniques.

Example 28 includes the method according example 25 or 26, wherein the MIMO techniques comprise multi-beam MIMO.

Example 29 includes the method according to example 27, wherein the MIMO techniques comprise multiple input multiple output orthogonal frequency division multiple access (MIMO-OFDM).

Example 30 includes the method according to example 27, wherein the MIMO techniques comprise multi-beam MIMO-OFDM.

Example 31 includes a method for a communication device with at least one antenna array composed of a plurality of antenna elements and a plurality of phase shifters, each of the plurality of antenna elements coupled to a respective phase shifter, the method comprising:
providing a set of optimized phase shifts for the plurality of phase shifters to perform beam forming along a direction of each steering angle of a plurality of pre-defined steering angles;
adding an additional phase having a distribution to account for a beam broadening to a set of optimized phase shifts to generate a set of optimized phase shifts for a selected beam broadening and a selected steering angle; and
configuring the plurality of phase shifters with a set of optimized phase shifts corresponding to the selected beam broadening and the selected steering angle to perform beam forming in direction of the selected steering angle with a beam having the selected beam broadening.

Example 32 includes the method according to example 30, wherein
adding an additional phase having a distribution to account for a beam broadening a set of optimal phase shifts comprises:
adding an additional phase having a distribution to account for a beam broadening to each set of optimized phase shifts to generate a set of optimized phase shifts for each of a plurality of pre-defined beam broadening and pre-defined steering angle.

Example 33 includes the method according to example 30, wherein each of the plurality of phase shifters is a digital phase shifter, the method further comprising:

quantizing each optimized phase shift after adding an additional phase having a distribution to account for a beam broadening; and:

configuring the plurality of phase shifters with the set of quantized optimized phase shifts corresponding to a selected beam broadening and a selected steering angle to perform beam forming in direction of the selected steering angle with a beam having the selected beam broadening.

Example 34 includes the method according to example 32, wherein quantizing each optimized phase shift comprises quantizing each optimized phase shift $\theta$ as follows:

$$\theta_i^q = Q(\theta_i), \theta_i^q \varepsilon \left\{ \frac{2\pi}{2^q} \mid i = 0, \ldots, 2^q - 1 \right\},$$

where $Q(.)$ is a q-bit quantizer.

Example 35 includes the method according to any of examples 30 to 33, wherein the selected beam broadening comprises any or a combination of the following: half power beam width, half power beam width in azimuth domain only, half power beam width in elevation domain only, half power beam width in azimuth domain and elevation domain, half power beam width of any side lobe, half power beam width of any side lobe in azimuth domain only, half power beam width of any side lobe in elevation domain only, half power beam width of any side lobe in azimuth domain and elevation domain.

Example 36 includes the method according to any of examples 31 to 34, wherein the distribution of the additional phase comprises a distribution of an additional phase $\phi_{Az}$ accounting for a beam broadening in azimuthal dimension which given by:

$$\varphi_{Az} = 4\pi c_{Az} \left| \frac{1}{2(N-1)} + \frac{n - \frac{N}{2} - 1}{N - 1} \right|^p,$$

wherein n denotes the n-th phase shifter of a row of antenna elements of a two-dimensional antenna array having N antenna elements in horizontal and M antenna elements in vertical dimension, wherein $c_{Az}$ is a design variable which defines a value of the beam broadening in azimuthal dimension and wherein p is a constant which defines side lobes of a beam.

Example 37 includes the method according to any of examples 31 to 35, wherein the distribution of the additional phase comprises a distribution of an additional phase $\phi_V$ for a accounting for a beam broadening in vertical dimension which is given by:

$$\varphi_V = 4\pi c_V \left| \frac{1}{2(M-1)} + \frac{m - \frac{M}{2} - 1}{M - 1} \right|^p,$$

wherein m denotes the m-th phase shifter of a column of antenna elements of a two-dimensional antenna array having N antenna elements in horizontal and M antenna elements in vertical dimension, wherein $c_V$ is a design variable which defines a value of the beam broadening in vertical dimension and wherein p is a constant which defines side lobes of a beam.

Example 38 includes the method according to any of examples 31 to 36, wherein a total additional phase $\phi(m, n)$ of an antenna element in a m-th row and a n-th column of the two dimensional antenna array for a beam broadening in azimuthal and vertical dimension is given by:

$$\phi(m,n) = \phi_{Az}(n-(m-1),N) + \phi_V(m), m=1, \ldots, M \; n=1, \ldots, N.$$

Example 39 includes the method according to any of examples 31 to 37, the method comprising:

storing each set of optimized phase shifts to a codebook, wherein each set of optimized phase shifts represents a code word of the codebook corresponding to its pre-defined steering angle and its pre-defined beam broadening and wherein each code word is addressable by its corresponding steering angle and its corresponding beam broadening; and retrieving a code word corresponding to a selected steering angle and selected beam broadening from the codebook; and configuring the plurality of phase shifters with the retrieved code word to perform beam forming in direction of the selected steering angle with a beam having the selected beam broadening.

Example 40 includes the method according to example 38, wherein the selected beam broadening comprises any or any combination of the following: half power beam width, half power beam width in azimuth domain only, half power beam width in elevation domain only, half power beam width in azimuth domain and elevation domain, half power beam width of a side lobe, half power beam width of a side lobe in azimuth domain only, half power beam width of a side lobe in elevation domain only, half power beam width of any side lobe in azimuth domain and elevation domain.

Example 41 includes the method according to example 38 or 39, wherein the codebook is addressable by the design variable which defines a value of a beam broadening and by constant p which defines side lobes of a beam.

Example 42 includes the method according to example 40, wherein storing each set of phase shifts to a codebook comprises:

defining a use case by a combination of design variable c and constant p; and wherein retrieving a code word corresponding to a selected steering angle and a selected beam broadening from the codebook comprises:

retrieving a code word corresponding to a selected steering angle and selected use case from the code word to perform beam forming for the selected use case in direction of the selected steering angle.

Example 43 includes the method according to example 41, wherein the use case comprises beam tracking, initial cell acquisition and initial user acquisition.

Example 44 includes the method according to example 42 wherein beam tracking comprises a narrower beam compared to initial cell acquisition or initial user acquisition.

Example 45 includes the method according to any of examples 30 to 43, wherein the communication device includes a plurality of antenna arrays, the method further comprising:

for each of the plurality of antenna arrays in use:
configuring the plurality of phase shifters of the respective antenna array with a set of optimized beam forming weights for a selected steering angle to perform beam forming in direction of the selected steering angle for the respective antenna array in use.

Example 46 includes the method according to any of examples 30 to 43, wherein the communication device includes a plurality of antenna arrays, the method further comprising:

for each of the plurality of antenna arrays in use:
configuring the plurality of phase shifters of the respective antenna array with a set of optimized beam forming weights for a selected beam broadening and a selected steering angle to perform beam forming in direction of the selected steering angle with a beam having the selected beam broadening.

Example 47 includes the method according to example 45, the method further comprising:

for each of the plurality of antenna arrays:
defining a pseudo-omni radiation pattern by a combination of design variable c constant p and steering angle chosen to generate a pseudo-omni radiation pattern; and wherein
retrieving a code word corresponding to a selected steering angle and a selected beam broadening from the codebook comprises:
retrieving a code word corresponding to the selected pseudo-omni ration pattern to perform beamforming for the pseudo-omni radiation pattern; and
configuring the plurality of phase shifters of each respective antenna array with the retrieved code word to generate a pseudo-omni radiation pattern.

Example 48 includes the method according to claim 45 or 46, the method further comprising: performing beam forming to generate a pseudo-omni radiation pattern in a receiver as well as in transmitter.

Example 49 includes the method according to example 44; wherein determining an optimized beam forming weight for each of the plurality of phase shifters comprises:

determining an optimized beam forming weight for each of the plurality of phase shifters of each of a plurality of antenna arrays in use by maximizing a total array gain of a combination of the plurality of antenna arrays in use for each steering angle of a plurality of pre-defined steering angles to generate a set of optimized beam forming weights for each steering angle; and
configuring the plurality of phase shifters of the plurality of antenna arrays in use with the set of optimized beam forming weights for a selected steering angle to perform beam forming in direction of the selected steering angle.

Example 50 includes the method according to example 48, the method further comprising:

storing each set of optimized phase shifts to a codebook, wherein each set of optimized phase shifts represents a code word of the codebook corresponding to its pre-defined steering angle and its number of antenna arrays in use and wherein each code word is addressable by its corresponding pre-defined steering angle and its number of antenna arrays in use; and retrieving a code word corresponding to a selected steering angle from the codebook; and configuring the plurality of phase shifters with the retrieved code word to perform beam forming for a combination of a number of antenna arrays in use in direction of the selected steering angle.

Example 51 includes the method according to example 49, the method further comprising:

for a combination of a plurality of antenna arrays in use:
defining a pseudo-omni radiation pattern by a combination of design variable c constant p and steering angle chosen to generate a pseudo-omni radiation pattern; and wherein
retrieving a code word corresponding to a selected steering angle and a selected beam broadening from the codebook comprises:
retrieving a code word corresponding to the selected pseudo-omni ration pattern to perform beamforming for the pseudo-omni radiation pattern; and
configuring the plurality of phase shifters of each respective antenna array of the plurality of antenna arrays in use with the retrieved code word to generate a pseudo-omni radiation pattern.

Example 52 includes the method according to any of examples 30 to 47, wherein each of the plurality of antenna arrays is coupled to a radio frequency (RF) chain, the method further comprising: using each RF chain as a multiple input multiple output (MIMO) port for applying MIMO techniques.

Example 53 includes the method according to example 48, the method further comprising: applying analogue beam steering by configuring the plurality of phase shifters of each antenna array in use to compensate for a path loss at millimeter wave bands; and
applying digital beamforming to perform MIMO techniques.

Example 54 includes the method according to example 48 or 49, wherein the MIMO techniques comprise multi-beam MIMO.

Example 55 includes the method according to example 48 or 49, wherein the MIMO techniques comprise multiple input multiple output orthogonal frequency division multiple access (MIMO-OFDM).

Example 56 includes the method according to example 51, wherein the MIMO techniques comprise multi-beam MIMO-OFDM.

Example 57 includes a method for a communication device with at least one antenna array composed of a plurality of antenna elements and a plurality of phase shifters, each of the plurality of antenna elements coupled to a respective phase shifter, the method comprising:

setting at least one beam forming parameter;
retrieving a code word of a plurality of code words from a codebook, each of the plurality of code words representing a set of phase shifts for the plurality of phase shifters; wherein each of the code words is associated with the at least one beam forming parameter;
using the code word to configure the plurality of phase shifters to perform beamforming corresponding to the at least one beam forming parameter.

Example 58 includes a method according to example 56, wherein the at least one beam forming parameter is a steering angle and wherein a set of phase shifts is designed to maximize an array gain of the at least one antenna array for performing beamforming along the direction of its corresponding steering angle.

Example 59 includes the method according to example 56, wherein the at least one beam forming parameter is a steering angle and wherein each set of phase shifts is designed to maximize an array-gain of the at least one antenna array for performing beamforming along the direction of its corresponding steering angle of a plurality of pre-defined steering angles.

Example 60 includes the method according to any of examples 56 to 58, the method comprising: wherein the at least one beam steering parameter includes a steering angle and a beam broadening and wherein the codebook is designed for generating a beam pattern in direction of a pre-defined steering angle with a beam having a pre-defined beam broadening.

Example 61 includes a method according to example 59, wherein the communication device includes a plurality of antenna arrays, each of the antenna arrays coupled to a respective RF chain and wherein the codebook is designed to maximize the gain of each antenna array for the at least one respective beam steering parameter.

Example 62 includes a method according to example 60, wherein the at least one beam steering parameter includes a steering angle for each of the antenna arrays in use and a beam broadening for each of the antenna arrays in use.

Example 63 includes a method according to any of example 56 to 61, wherein each code word of the codebook includes a quantized phase for each phase shifter and wherein each antenna element is coupled to digital phase shifter.

Example 64 includes a method according to any of example 56 to 62, wherein setting the at least one beam steering parameter comprises setting the at least one beam steering parameter to a desired half power beam width of a beam to broaden the beam and wherein the codebook is designed for generating a beam steering pattern with the beam having the desired half power beam width.

Example 65 includes a method according to any of examples 56 to 63, wherein each phase shift of each code word consists of phase value accounting for an array gain of the at least one antenna array and an additional phase value accounting for a half power beam width.

Example 66 includes a method according to example 64, wherein the additional phase accounting for the half power beam with follows a quadratic distribution over the number of antenna elements in horizontal or vertical dimension.

Example 67 includes a method according to example 65, wherein the additional phase value accounting for the half power beam width (HPBW) comprises an additional phase value $\varphi_{Az}$ accounting for HPBW in azimuthal dimension which is given by:

$$\varphi_{Az} = 4\pi c_{Az} \left| \frac{1}{2(N-1)} + \frac{n - \frac{N}{2} - 1}{N-1} \right|^p,$$

wherein n denotes the n-th phase shifter of a row of antenna elements of a two-dimensional antenna array having N antenna elements in horizontal and M antenna elements in vertical dimension, wherein $c_{Az}$ is a design variable which defines a value of the beam broadening in azimuthal dimension and wherein p is a constant which defines side lobes of a beam.

Example 68 includes a method according to example 66, wherein the distribution of the additional phase value accounting for the HPBW comprises an additional phase value $\varphi_V$ accounting for a HPBW in vertical dimension which is given by in vertical dimension is given by:

$$\varphi_V = 4\pi c_V \left| \frac{1}{2(M-1)} + \frac{m - \frac{M}{2} - 1}{M-1} \right|^p,$$

wherein m denotes the m-th phase shifter of a column of antenna elements of a two-dimensional antenna array having N antenna elements in horizontal and M antenna elements in vertical dimension, wherein $c_V$ is a design variable which defines a value of the beam broadening in vertical dimension and wherein p is a constant which defines side lobes of a beam.

Example 69 includes a method according to example 66, wherein a total additional phase value $\varphi(m, n)$ of an antenna element in a m-th row and a n-th column of the two dimensional antenna array is given by $$\varphi(m,n) = \varphi_{Az}(n-(m-1)N) + \varphi_V(m), m=1, \ldots, M\ n=1, \ldots, N.$$

Example 70 includes a method according to any of claims 64 to 68, wherein setting the at least one beam steering parameter comprises setting the at least one beam steering parameter to a desired half power beam width suitable for beam tracking.

Example 71 includes a method according to any of examples 64 to 68, wherein setting the at least one beam steering parameter comprises setting the at least one beam steering parameter to a desired half power beam width suitable for initial cell acquisition.

Example 72 includes a method according to any of examples 64 to 68, wherein setting the at least one beam steering parameter comprises setting the at least one beam steering parameter to a desired half beam width suitable for initial user acquisition.

Example 73 includes a method according to any of examples 64 to 68, wherein setting the at least one beam steering parameter comprises setting a number of arrays in use to all available arrays and setting a half power beam width to apply large broadening to generate a pseudo-omni beam steering pattern.

Example 74 includes a method according to example 72, the method comprising: using the pseudo-omni beam steering pattern for initial cell acquisition.

Example 75 includes a method according to example 72, the method comprising: using the pseudo-omni beam steering pattern for initial user acquisition.

Example 76 includes a method according to any of examples 57 to 75 comprising: using each antenna array as a multiple input multiple output (MIMO) port for applying MIMO techniques.

Example 77 includes a method according to example 76, wherein the MIMO techniques comprise multi-beam MIMO.

Example 78 includes a method according to example 77, wherein the MIMO techniques comprise multiple input multiple output orthogonal frequency division multiple access (MIMO-OFDM).

Example 79 includes a method for generating a codebook for use in a method according to example 56 to 78, the method comprising:
optimizing phase shift values for phase shifters employed for beam forming of a beam of an antenna array by maximizing an array gain of the antenna array for at least one beam forming parameter; wherein a set of optimized phase shift values defines a code word of a codebook corresponding to a specific value of the at least one beam forming parameter.

Example 80 includes a method according to example 79, the method comprising:
wherein the at least one beam forming parameter comprises any or a combination of the following: steering angle, half power beam width, half power beam width in azimuth domain only, half power beam width in elevation domain only, half power beam width in azimuth domain and elevation domain, half power beam width of any side lobe, half power beam width of any side lobe in azimuth domain only, half power beam width of any side lobe in elevation domain only, half power beam width of any side lobe in azimuth domain and elevation domain.

Example 81 includes a communication device comprising a radio frequency (RF) unit configured to have one or more antenna arrays, wherein each of the antenna arrays is configured to have of a plurality of antenna elements: wherein each of the plurality of antenna elements is coupled to a corresponding phase shifter of a plurality of phase shifters; wherein the plurality of phase shifters are configurable with a set of optimized beamforming weights for each steering angle of a plurality of pre-defined steering angles; and a baseband unit configured to generate a set of optimized beamforming weights for each steering angle of the plurality of pre-defined steering angles, wherein the baseband unit is further configured to provide the plurality of phase shifters with the set of optimized beam forming weights for a selected steering angle; and wherein the RF unit is configured to perform beam forming in a direction of the selected steering angle.

Example 82 includes the communication device according to example 81, wherein a set of optimized beam forming weights is designed to maximize an array gain of the at least one antenna array for performing beamforming along the direction of its corresponding steering angle.

Example 83 includes the communication device according to example 81 or 82 further comprising a memory configured to store a codebook comprising a plurality of code words, wherein each code word represents a set of optimized beam forming weights corresponding to its pre-defined steering angle and wherein each code word is addressable by its corresponding pre-defined steering angle; and wherein the baseband unit is configured to retrieve a code word corresponding to a selected steering angle from the codebook; and wherein the baseband unit is further configured to provide the plurality of phase shifters with the retrieved code.

Example 84 includes the communication device according to example 81 or 82 further comprising a memory configured to store a codebook comprising a plurality of code words, wherein each code word represents a set of optimized beam forming weights, wherein each beamforming weight is composed of a phase shift accounting for a steering angle of a plurality of pre-defined steering angles and an additional phase shift accounting for a beam broadening of a plurality of pre-defined beam broadening and wherein each code word is addressable by its corresponding pre-defined steering angle and its pre-defined beam broadening; and wherein the baseband unit is configured to retrieve a code word corresponding to a selected steering angle and a selected beam broadening from the codebook; and wherein the baseband unit is further configured to provide the plurality of phase shifters with the retrieved code word; and wherein the RF unit is configured to perform beam forming in direction of the selected steering angle with a beam having the selected beam broadening.

Example 85 includes the communication device according to example 81 or 82, wherein the baseband unit is further configured to add an additional phase having a distribution to account for a beam broadening to a set of optimized beam forming weights to generate a set of optimized beam forming weights for a selected beam broadening and a selected steering angle; wherein the baseband unit is further configured to provide the plurality of phase shifters with the set of optimized phase beam forming weights corresponding to the selected beam broadening and the selected steering angle; and wherein the RF unit is configured to perform beam forming in direction of the selected steering angle with a beam having the selected beam broadening.

Example 86 includes the communication device according to example 85, wherein the additional phase having a distribution to account for a beam broadening comprises an additional phase $\phi_{Az}$ to account for a half power beam width (HPBW) in azimuthal dimension which is given by:

$$\varphi_{Az} = 4\pi c_{Az} \left| \frac{1}{2(N-1)} + \frac{n - \frac{N}{2} - 1}{N-1} \right|^p,$$

wherein n denotes the n-th phase shifter of a row of antenna elements of a two-dimensional antenna array having N antenna elements in horizontal and M antenna elements in vertical dimension, wherein $c_{Az}$ is a design variable which defines a value of the beam broadening in azimuthal dimension and wherein p is a constant which defines side lobes of a beam.

Example 87 includes the communication device according to example 86, wherein the additional phase to account for a beam broadening comprises an additional phase $\phi_V$ to account for a half power beam width (HPBW) in vertical dimension which is given by:

$$\varphi_V = 4\pi c_V \left| \frac{1}{2(M-1)} + \frac{m - \frac{M}{2} - 1}{M-1} \right|^p,$$

wherein m denotes the m-th phase shifter of a column of antenna elements of a two-dimensional antenna array having N antenna elements in horizontal and M antenna elements in vertical dimension, wherein $c_V$ is a design variable which defines a value of the beam broadening in vertical dimension and wherein p is a constant which defines side lobes of a beam.

Example 88 includes the communication device according to example 86, wherein a total additional phase $\phi(m, n)$ of an antenna element in a m-th row and a n-th column of the two dimensional antenna array is given by $\phi(m,n) = \phi_{Az}(n-(m-1),N) + \phi_V(m), m=1, \ldots, M\ n=1, \ldots, N.$ Example 89 includes the communication device according any of examples 81 to 88 comprising a plurality of antenna arrays, wherein the baseband unit is configured to provide the plurality of phase shifters of each of the plurality of antenna arrays in use with the set of optimized beam forming weights for a selected beam broadening and a selected steering, and wherein the RF unit is configured to perform beam forming in direction of the selected steering angle with a beam having the selected beam broadening for each antenna array in use.

Example 90 includes the communication device according to example 89, wherein the baseband is configured to retrieve a code word corresponding to the selected pseudo-omni ration pattern to perform beamforming for the pseudo-omni radiation pattern for each of the plurality of antenna arrays.

Example 91 includes the communication device according to any of examples 83 to 85, wherein the at least one beam forming parameter comprises any or a combination of the following: steering angle, half power beam width, half power beam width in azimuth domain only, half power beam width in elevation domain only, half power beam width in azimuth domain and elevation domain, half power beam width of any side lobe, half power beam width of any side lobe in azimuth domain only, half power beam width of any side lobe in elevation domain only, half power beam width of any side lobe in azimuth domain and elevation domain.

Example 92 includes the communication device according to any of examples 81 to 91, wherein the baseband unit comprises a digital pre-coder having a plurality of multiple input multiple output (MIMO) ports wherein each of the plurality of MIMO ports is coupled to a corresponding RF chain of the RF unit.

Example 93 includes the communication device according to example 92, wherein the baseband unit is configured to apply digital beamforming to perform MIMO techniques and wherein the baseband unit is further configure to configure the RF unit to apply analogue beam steering to compensate for a path loss at millimeter wave bands.

Example 94 includes the communication device according to example 93, wherein the MIMO techniques comprise multi-beam MIMO.

Example 95 includes the communication device according to example 94, wherein the baseband unit further comprises a Fast Fourier Transform (FFT) and Inverse Fast Fourier Transform (IFFT) unit and wherein the MIMO techniques comprise MIMO-OFDM.

Example 96 includes the communication device according to example 95, wherein the MIMO techniques comprise multi-beam MIMO-OFDM.

Example 97 includes the communication device according to any of examples 81 to 96, wherein each of the plurality of phase shifters is a digital phase shifter.

Example 98 includes the communication device according to example 97, wherein the digital phase shifter is a three bit digital phase shifter.

Example 99 includes the communication device according to any of claims 81 to 98, wherein the baseband unit is configured to provide a set of beam forming weights to the plurality of phase shifters of each antenna array in use, wherein the set of beam forming weights is suitable for beam tracking.

Example 100 includes the communication device according to examples 81 to 98, wherein the baseband unit is configured to provide a set of beam forming weights to the plurality of phase shifters of each antenna array in use, wherein the set of beam forming weights is suitable for initial cell or user acquisition.

Example 101 includes a non-transitory computer readable medium with computer readable instructions to cause a processor to execute a method for a communication device with at least one antenna array composed of a plurality of antenna elements, each of the plurality of antenna elements coupled to a corresponding phase shifter of a plurality of phase shifters, the method comprising:
  determining an optimized beam forming weight for each of the plurality of phase shifters by maximizing an array gain of the antenna array for each steering angle of a plurality of pre-defined steering angles to generate a set of optimized beam forming weights for each steering angle; and
  configuring the plurality of phase shifters with the set of optimized beam forming weights for a selected steering angle to perform beam forming in direction of the selected steering angle.

What is claimed is:

1. A method for beamforming used in a communication device having one or more antenna arrays configured to have a plurality of antenna elements, each of the plurality of antenna elements coupled to a corresponding phase shifter of a plurality of phase shifters, the method comprising:
  setting a plurality of pre-defined steering angles;
  determining an optimized beam forming weight for each of the plurality of phase shifters by maximizing an array gain of the one or more antenna arrays for each steering angle of the plurality of pre-defined steering angles; wherein the optimized beam forming weight represents a phase shift θ;
  generating a set of optimized beam forming weights for each steering angle based on the optimized beam forming weight for each of the plurality of phase shifters; and
  configuring the plurality of phase shifters with the set of optimized beam forming weights for a selected steering angle to perform beam forming in a direction of the selected steering angle.

2. The method according to claim 1 further comprising:
  storing each set of optimized beam forming weights to a codebook, wherein each set of optimized beam forming weights represents a code word of the codebook corresponding to a pre-defined steering angle and wherein each code word is addressable by the corresponding pre-defined steering angle; and
  retrieving a code word corresponding to a selected steering angle from the codebook; and
  configuring the plurality of phase shifters with the retrieved code word to perform beam forming in direction of the selected steering angle.

3. The method according to claim 1, wherein each of the plurality of phase shifters is a digital phase shifter, the method further comprising:
  quantizing each beam forming weight of each set of optimized beam forming weights to generate a set of quantized optimized beam forming weights for each of the plurality of pre-defined steering angles; and
  configuring the plurality of phase shifters with the set of quantized optimized beam forming weights corresponding to a selected steering angle to perform beam forming in direction of the selected steering angle.

4. The method according to claim 1, wherein quantizing each beam forming weight comprises quantizing each phase shift θ using a q-bit quantizer having quantization intervals of the same size, each quantization interval representing a portion of a unit circle.as follows:

$$\theta_i^q = Q(\theta_i),\; \theta_i^q \varepsilon \left\{ \frac{2\pi}{2^q} \;\bigg|\; i = 0, \ldots, 2^q - 1 \right\},$$

where Q(.) is a q-bit quantizer.

5. The method according to claim 1, the method further comprising:
  adding an additional phase having a distribution to account for a beam broadening to each set of optimized beam forming weights to generate a set of optimized beam forming weights for each of a plurality of pre-defined beam broadening and pre-defined steering angle; and
  configuring the plurality of phase shifters with the set of optimized beam forming weights for a selected beam broadening and a selected steering angle to perform beam steering in direction of the selected steering angle with a beam having the selected beam broadening.

6. The method according to claim 5, wherein each of the plurality of phase shifters is a digital phase shifter, the method further comprising:
quantizing each beam forming weight after adding an additional phase having a distribution to account for a beam broadening to generate a set of quantized beam forming weights for each of a plurality of pre-defined beam broadening and pre-defined steering angle; and
configuring the plurality of phase shifters with the set of quantized optimized beam forming weights for a selected beam broadening and a selected steering angle to perform beam steering in direction of the selected steering angle with a beam having the selected beam broadening.

7. The method according to claim 5, wherein the selected beam broadening comprises any or a combination of the following:
half power beam width, half power beam width in azimuth domain only, half power beam width in elevation domain only, half power beam width in azimuth domain and elevation domain, half power beam width of any side lobe, half power beam width of a side lobe in azimuth domain only, half power beam width of a side lobe in elevation domain only, half power beam width of a side lobe in azimuth domain and elevation domain.

8. The method according to claim 5, wherein the distribution of the additional phase comprises a distribution for an additional phase accounting for a beam broadening in azimuthal dimension which is given by:

$$\varphi_{Az} = 4\pi c_{Az} \left| \frac{1}{2(N-1)} + \frac{n - \frac{N}{2} - 1}{N-1} \right|^p,$$

wherein n denotes the n-th phase shifter of a row of antenna elements of a two-dimensional antenna array having N antenna elements in horizontal and M antenna elements in vertical dimension, wherein $c_{Az}$ is a design variable which defines a value of the beam broadening in azimuthal dimension and wherein p is a constant which defines side lobes of a beam.

9. The method according to claim 5, wherein the distribution of the additional phase comprises a distribution of an additional phase $\phi_V$ accounting for the beam broadening in vertical dimension which is given by:

$$\varphi_V = 4\pi c_V \left| \frac{1}{2(M-1)} + \frac{m - \frac{M}{2} - 1}{M-1} \right|^p,$$

wherein m denotes the m-th phase shifter of a column of antenna elements of a two-dimensional antenna array having N antenna elements in horizontal and M antenna elements in vertical dimension, wherein $c_V$ is a design variable which defines a value of the beam broadening in vertical dimension and wherein p is a constant which defines side lobes of a beam.

10. The method according to claim 8, wherein a total additional phase $\phi(m, n)$ of an antenna element in a m-th row and a n-th column of the two dimensional antenna array is given by $$\phi(m,n)=\phi_{Az}(n-(m-1),N)+\phi_V(m), m=1,\ldots, M\ n=1,\ldots,N.$$

11. The method according to claim 5, the method comprising:
storing each set of optimized beam forming weights to a codebook, wherein each set of optimized beam forming weights represents a code word of the codebook corresponding to a pre-defined steering angle and a pre-defined beam broadening and wherein each code word is addressable by the corresponding pre-defined steering angle and the pre-defined beam broadening; and
retrieving a code word corresponding to a selected steering angle and a selected beam broadening from the codebook; and
configuring the plurality of phase shifters with the retrieved code word to perform beam forming in direction of the selected steering angle with a beam having the selected beam broadening.

12. The method according to claim 11, wherein the selected beam broadening comprises any or a combination of the following:
half power beam width, half power beam width in azimuth domain only, half power beam width in elevation domain only, half power beam width in azimuth domain and elevation domain, half power beam width of any side lobe, half power beam width of any side lobe in azimuth domain only, half power beam width of any side lobe in elevation domain only, half power beam width of any side lobe in azimuth domain and elevation domain.

13. The method according to claim 11, wherein the codebook is addressable by design variable c which defines a value of a beam broadening and by constant p which defines side lobes of a beam.

14. The method according to claim 13, wherein
storing each set of optimized beam forming weights to a codebook comprises:
defining a use case by a combination of design variable c and constant p; and wherein
retrieving a code word corresponding to a selected steering angle and a selected beam broadening from the codebook comprises:
retrieving a code word corresponding to a selected steering angle and selected use case from the code word to perform beam forming for the selected use case in direction of the selected steering angle.

15. The method according to claim 14, wherein the use case comprises beam tracking, initial cell acquisition or initial user acquisition.

16. The method according to claim 15, wherein beam tracking comprises a narrower beam compared to initial cell acquisition or initial user acquisition.

17. The method according to claim 5, wherein the selected beam broadening comprises a selected half power beam width maintained over a full range from broadside to endfire.

18. The method according to claim 1, wherein the communication device includes a plurality of antenna arrays, the method further comprising:
for each of the plurality of antenna arrays in use:
configuring the plurality of phase shifters of each of the plurality of antenna arrays in use with the set of optimized beam forming weights for a selected beam broadening and a selected steering angle to perform beam forming in direction of the selected steering angle with a beam having the selected beam broadening.

19. The method according to claim 18 further comprising:

for each of the plurality of antenna arrays:

storing each set of optimized beam forming weights to a codebook, wherein each set of optimized beam forming weights represents a code word of the codebook corresponding to a pre-defined steering angle and a pre-defined beam broadening and wherein each code word is addressable by the corresponding pre-defined steering angle and the beam broadening; and for each of the plurality of antenna arrays:

retrieving a code word corresponding to a selected steering angle from the codebook; and configuring the plurality of phase shifters with the retrieved code word to perform beam forming for a combination of a number of antenna arrays in use in direction of the selected steering angle.

20. A method for a communication device with at least one antenna array composed of a plurality of antenna elements and a plurality of phase shifters, each of the plurality of antenna elements coupled to a respective phase shifter, the method comprising:

determining a set of optimized phase shifts for the plurality of phase shifters to perform beam forming along a direction of each steering angle of a plurality of pre-defined steering angles;

adding an additional phase having a distribution to account for a beam broadening to a set of optimized phase shifts to generate a set of optimized phase shifts for a selected beam broadening and a selected steering angle; and configuring the plurality of phase shifters with a set of optimized phase shifts corresponding to the selected beam broadening and the selected steering angle to perform beam forming in direction of the selected steering angle with a beam having the selected beam broadening.

21. A method for a communication device with at least one antenna array composed of a plurality of antenna elements and a plurality of phase shifters, each of the plurality of antenna elements coupled to a respective phase shifter, the method comprising:

determining a set of optimized phase shifts for the plurality of phase shifters;

setting at least one beam forming parameter;

retrieving a code word of a plurality of code words from a codebook, each of the plurality of code words representing the set of optimized phase shifts for the plurality of phase shifters; wherein each of the code words is associated with the at least one beam forming parameter;

using the code word to configure the plurality of phase shifters to perform beamforming corresponding to the at least one beam forming parameter.

22. A communication device comprising a radio frequency (RF) unit configured to have one or more antenna arrays, wherein each of the antenna arrays is configured to have of a plurality of antenna elements: wherein each of the plurality of antenna elements is coupled to a corresponding phase shifter of a plurality of phase shifters; wherein the plurality of phase shifters are configurable with a set of optimized beamforming weights for each steering angle of a plurality of pre-defined steering angles; wherein each optimized beamforming weight represents a phase shift $\theta$; and a baseband unit configured to generate a set of optimized beamforming weights for each steering angle of the plurality of pre-defined steering angles, wherein the baseband unit is further configured to provide the plurality of phase shifters with the set of optimized beam forming weights for a selected steering angle; and wherein the RF unit is configured to perform beam forming in a direction of the selected steering angle.

23. The communication device according to claim 22, wherein a set of optimized beam forming weights is designed to maximize an array gain of the at least one antenna array for performing beamforming along the direction of its corresponding steering angle.

24. A non-transitory computer readable medium with computer readable instructions to cause a processor to execute a method for a communication device with at least one antenna array composed of a plurality of antenna elements, each of the plurality of antenna elements coupled to a corresponding phase shifter of a plurality of phase shifters, the method comprising:

determining an optimized beam forming weight for each of the plurality of phase shifters by maximizing an array gain of the antenna array for each steering angle of a plurality of pre-defined steering angles to generate a set of optimized beam forming weights for each steering angle; wherein the optimized beamforming weight represents a phase shift $\theta$; and configuring the plurality of phase shifters with the set of optimized beam forming weights for a selected steering angle to perform beam forming in direction of the selected steering angle.

* * * * *